United States Patent [19]

Pappalardo et al.

[11] 4,250,698
[45] Feb. 17, 1981

[54] GRASS CATCHER

[75] Inventors: P. Paul Pappalardo, Greenwich, Conn.; Carle C. Conway, Leroy; Frank Rodon, Batavia, both of N.Y.

[73] Assignee: Eastern Molding International, Inc., Batavia, N.Y.

[21] Appl. No.: 951,116

[22] Filed: Oct. 13, 1978

[51] Int. Cl.³ .................................... A01D 35/22
[52] U.S. Cl. ............................ 56/202; 56/16.6
[58] Field of Search ........................ 56/202, 16.6; 85/DIG. 2; 220/315

[56] References Cited

U.S. PATENT DOCUMENTS

| | | | |
|---|---|---|---|
| 2,426,326 | 8/1947 | Tooms | 85/DIG. 2 |
| 2,955,402 | 10/1960 | Strasel | 56/202 |
| 2,955,404 | 10/1960 | Strasel et al. | 56/202 |
| 2,983,095 | 5/1961 | Barth | 56/202 |
| 3,113,690 | 12/1963 | Swenck | 220/315 |
| 3,423,917 | 1/1969 | Leader | 56/202 |
| 3,521,436 | 7/1970 | Venzke | 56/202 |
| 3,522,695 | 8/1970 | Musgrave | 56/202 |
| 3,925,972 | 12/1975 | Anderson | 56/202 |
| 4,106,272 | 8/1978 | Peterson et al. | 56/202 |

FOREIGN PATENT DOCUMENTS 556327  4/1958  Canada ........................... 85/DIG. 2

Primary Examiner—Paul J. Hirsch
Attorney, Agent, or Firm—Harness, Dickey & Pierce

[57] ABSTRACT

A molded plastic grass catcher for a lawn mower or the like. The catcher is formed from a two piece construction so that it may be shipped in a compact, knocked-down condition but easily assembled by the ultimate user. The housing is configured with a pair of air outlets that are disposed out of the path of discharge from the mower discharge chute so as to permit the free exit of air while at the same time precluding the discharge of grass. In some embodiments of the invention, a baffle is also positioned between the inlet and outlet so as to further add in the grass separation without restricting the air flow.

6 Claims, 6 Drawing Figures

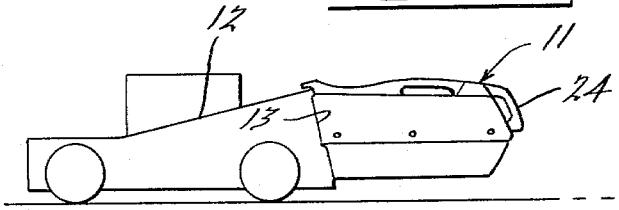
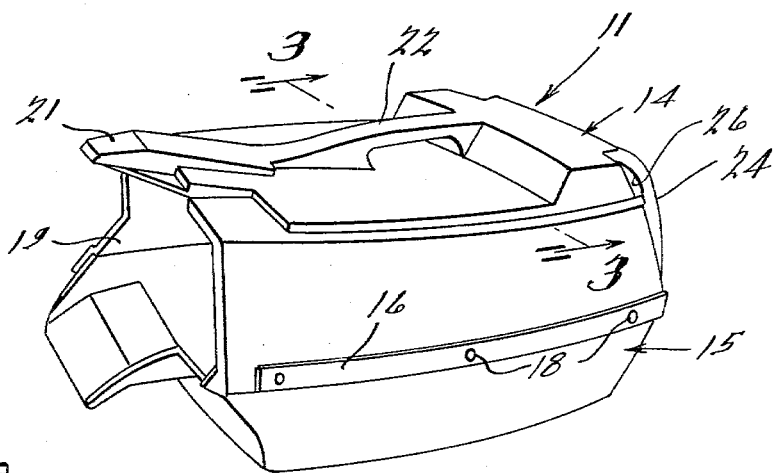
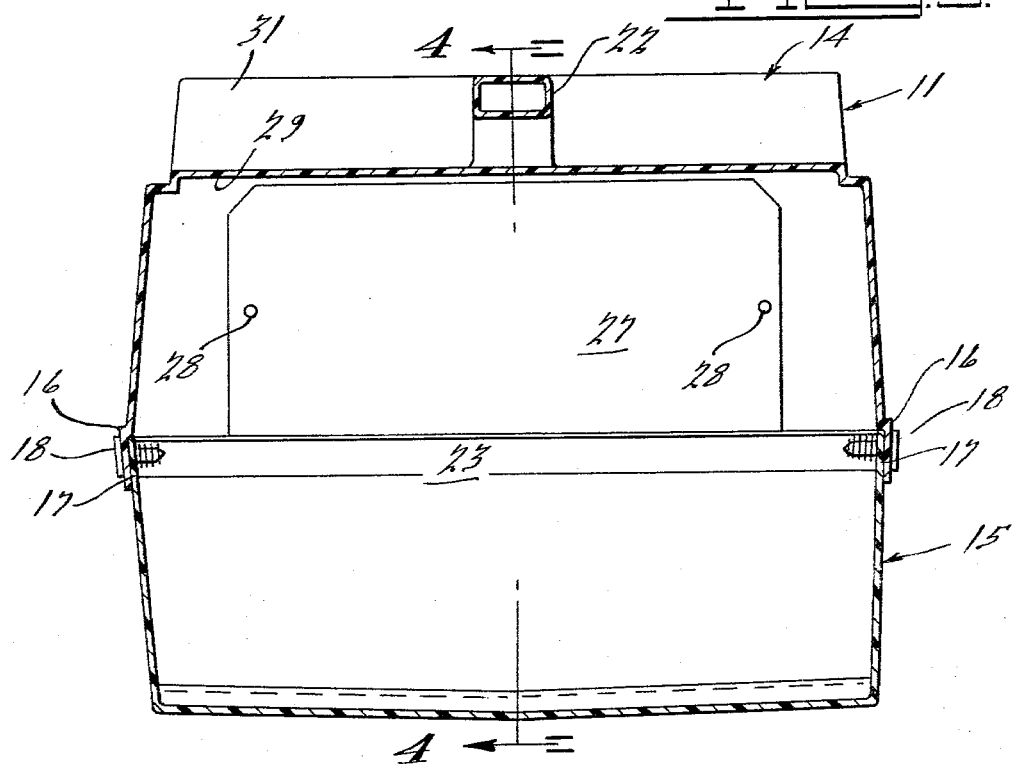

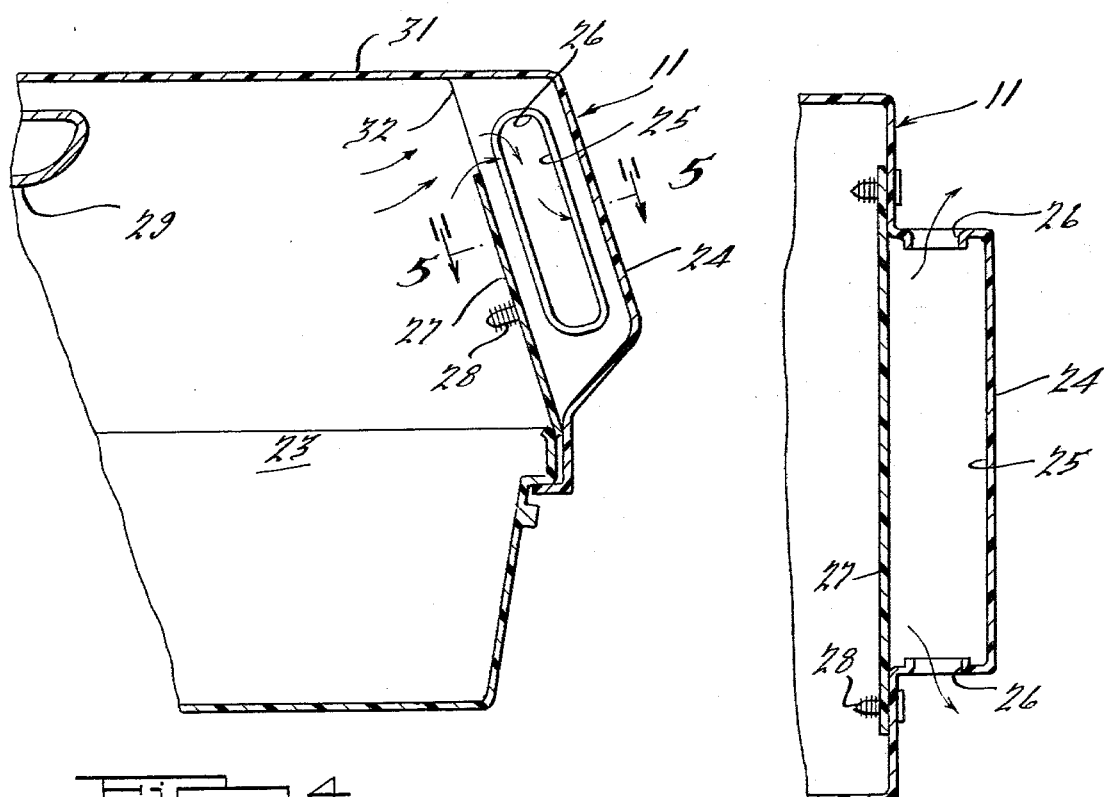
Fig. 4.
Fig. 5.
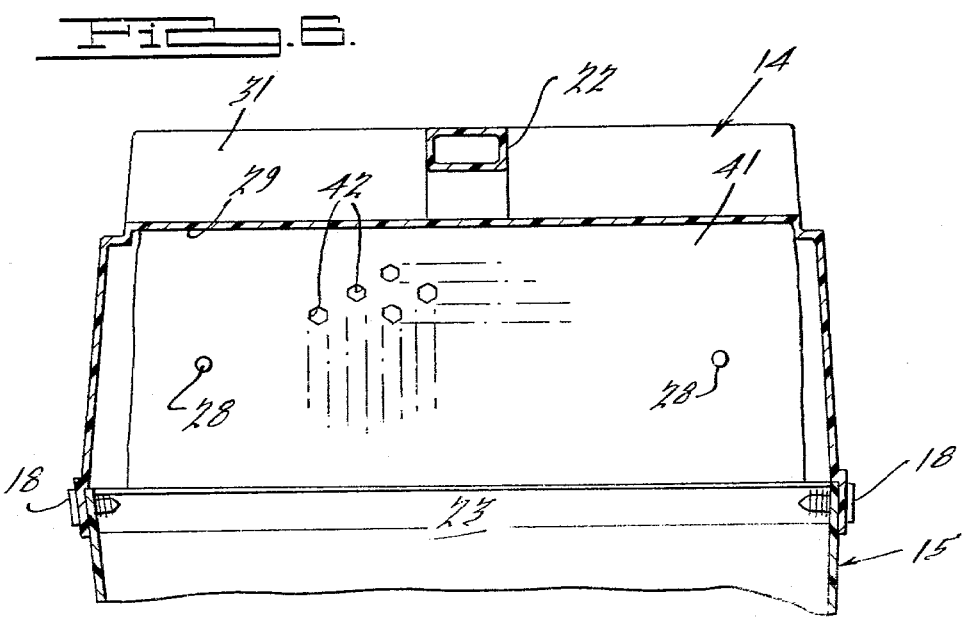
Fig. 6.

GRASS CATCHER

BACKGROUND OF THE INVENTION

This invention relates to a grass catcher for a lawn mower or the like and more particularly an improved, rigid grass catcher.

It has been the general practice with rotary lawn mowers to employ flexible cloth bag grass catchers. Such catchers, however, have several disadvantages, the prime one being their rapid deterioration and short life. In order to provide a longer life grass catcher for rotary mowers, it has been proposed to use a rigid housing formed from molded plastic and the like. However, it has heretofor been difficult to provide a fully effective, rigid grass catcher.

Although rigid grass catchers provide some safety advantages, it is essential to insure good air flow through the grass catcher so as to not restrict the grass and air discharge from the discharge chute of the rotary lawn mower. Somewhat inconsistent with this requirement, is the necessity for the catcher to separate the grass from the air so that the grass is not discharged from the air outlet. It is also desireable to provide some device for precluding the discharge of solid objects as may be picked up by the mower during its use from the outlet where injury to the user or bystanders might occur.

It is, therefore, a principal object of this invention to provide an improved, rigid grass catcher for a rotary mower or the like.

It is another object of the invention to provide a rigid grass catcher for a rotary mower that is effective in separating grass clippings and solid objects from the air without restricting air flow through the catcher.

Another possible disadvantage in connection with the use of solid grass catchers is the space required for shipment and storage. Although these problems may be offset by selling the grass catcher in a knocked-down form, this poses the disadvantage of requiring the purchaser to assemble the unit.

It is, therefore, a further object of this invention to provide a simple two piece rigid grass catcher which may be easily assembled.

SUMMARY OF THE INVENTION

A first feature of this invention is adapted to be embodied in a grass catcher for a rotary lawn mower or the like. The grass catcher comprises a relatively rigid housing having an inlet opening positioned to be in registry with the discharge chute of a rotary mower when attached and a cavity in registry with the inlet opening to receive grass clippings or the like thrown into the housing by the associated mower. An air outlet is also formed in the housing to permit air to exit therefrom. In connection with this feature of the invention, means are interposed in the path of air flow through the housing from the inlet opening to the air outlet for intercepting the flow of grass and substantially precluding its exit from the air outlet.

In accordance with another feature of the invention, the grass catcher, as described in the preceding paragraph, is formed from a two piece construction, the halves of which may be nested together during shipment for assembly by the ultimate user.

BRIEF DESCRIPTION OF THE DRAWINGS

FIG. 1 is a side elevational view, on a reduced scale of a rotary lawn mower and grass catcher embodying this invention.

FIG. 2 is a perspective view of the grass catcher.

FIG. 3 is an enlarged cross-sectional view taken along the line 3—3 of FIG. 2.

FIG. 4 is a cross-sectional view taken along the line 4—4 of FIG. 3.

FIG. 5 is a cross-sectional view taken along the line 5—5 of FIG. 4.

FIG. 6 is a partial cross-sectional view, in part similar to FIG. 3, showing another embodiment of the invention.

DETAILED DESCRIPTION OF THE PREFERRED EMBODIMENTS

In FIG. 1 a molded plastic grass catcher embodying this invention is identified generally by the reference numeral 11 and is shown in its operative position on a rotary lawn mower 12. As will become apparent, the grass catcher 11 is positioned with an inlet in registry with the discharge chute 13 so as to receive grass clippings and air thrown from the discharge chute 13, as is well known with this type of mower. The construction of the grass catcher 11 is such that it may be shipped in knocked-down form and easily assembled by the ultimate user. Furthermore, the construction is such that the grass is effectively separated from the air prior to air discharge from the catcher 11.

Referring now primarily to FIGS. 2-5, the grass catcher 11 is formed from a suitable plastic which may be blow molded and includes an upper half, indicated generally by the reference numeral 14, and a lower half, indicated generally by the reference numeral 15. The halves 14 and 15 are configured so that they may be shipped in a knocked-down, nested condition. For ease of assembly, the lower peripheral edge of the upper half 14 is formed with flanges 16 along its opposite sides that are adapted to receive an upstanding lip 17 formed by the lower half 15. A series of apertures are formed in the flanges 16 and lips 17 through which plastic rivets 18 of a snap-in variety may be inserted by the ultimate user so as to connect the halves 14 and 15 together.

The halves 14 and 15 define an inlet opening 19 which, as has been noted, is adapted to be positioned in registry with the discharge chute 13 of the mower 12. A forwardly extending portion 21 of the upper half 14 is formed with suitable attachment means (not shown) so as to detachably connect the catcher 11 to the mower 12.

A handle portion 22 is integrally formed with the upper half 14 so that the catcher 11 may be carried and conveniently manipulated for attachment to the mower 12 or for dumping of the grass clippings from the large cavity 23 formed by the halves 14 and 15.

In connection with any grass catcher for a rotary mower, it is essential to provide adequate air flow through the catcher body so as to not restrict the discharge from the mower. However, this air flow should be controlled so that solid objects cannot be thrown out where they might injure the user or bystanders. Of course, it is also essential to prevent the discharge of the grass clippings from the air discharge. The structure for separating the grass clippings from the air should also be such that it cannot become clogged by the grass clippings and thus impede the operation of the catcher or require frequent emptying of it.

A protruberance 24 is formed at the rear end of the upper half 14 generally in alignment with the inlet opening 19. The protruberance 24 provides a wall 25 that faces the opening 19. The sides of the protruberance 24 are formed with air outlet openings 26, which open perpendicularly to the direction of air flow from the mower discharge chute 13. Wall 25, therefore, acts as a baffle so as to separate grass clippings from the air flowing through the catcher 11 and to prevent the discharge of solid objects which might injure persons in the vicinity of the mower 12.

In order to further improve the efficiency of separation of solid particles and grass clippings from the air flow, a secondary baffle plate 27 is affixed to the cover half 14 in parallel relationship to the wall 25. The baffle 27 is secured to the cover half 14 by means of a pair of plastic snap-in fasteners 28 similar to the fasteners 18. The baffle 27 extends upwardly and terminates adjacent the lower edge 29 of the major portion of the upper half 14. A kicked up section 31 is formed at the rear end of the cover half 14 so as to permit the air flow through the catcher 11 to be turned by the baffle 27 and flow through a relatively large air gap 32 formed between the upper edge of the baffle 27 and the kicked up portion 31. Thus, a labyrinth air passage is provided which will improve the efficiency of the separation without substantially restricting the air flow. This baffling arrangement provided by the baffle 27, wall 25 and non-aligned air outlets 26 also does not require any periodic cleaning, thus enhancing the device.

FIG. 6 shows another embodiment of the invention which is substantially the same as the preceding embodiment. In this embodiment, however, a baffle plate 41 is positioned ahead of the wall 25 and extends substantially across the path of air flow before the air may enter the protruberance 24. The baffle 41 is formed from a perforated plastic having a plurality of openings 42 which are sized so as to permit air flow while effectively separating the grass clippings from the air prior to discharge. In all other respects, this embodiment is the same as the previously described embodiment.

It is to be understood that the foregoing description is that of a preferred embodiment of the invention. Various changes and modifications may be made without departing from the spirit and scope of the invention as defined by the appended claims.

We claim:

1. In a grass catcher for a rotary lawn mower or the like comprising a relatively rigid closed, normally non-openable housing defining an elongated grass receiving and accumulating cavity between front and rear walls of said housing, said front wall having an inlet opening positioned to be in registry with the discharge chute of a rotary mower when attached thereto for delivery of air and grass clippings into said cavity, said inlet opening also serving as an opening for dumping accumulated grass clippings from said cavity when said grass catcher is not attached to a mower and when said housing is closed, a protruberance formed at the end of said housing opposite said inlet opening and extending rearwardly from said wear wall at a point above the lower wall of said cavity, said protruberance being formed in part by a rear surface aligned in the path of air flow from said inlet opening, said rear surface being spaced rearwardly of said rear wall, an air outlet formed in a side of said protruberance and out of alignment with said inlet opening for permitting air to exit from a side of said housing, said rear surface of said protruberance being interposed in the path of air through said housing from said inlet opening to said air outlet for intercepting the flow of grass and substantially precluding grass clippings from exiting from said air outlet, and a baffle interposed between said air outlet and said cavity contiguous to said rear wall for assisting in the preclusion of grass clippings from passing through said air outlet.

2. A grass catcher as set forth in claim 1 wherein the baffle is perforated to permit air to flow therethrough.

3. A grass catcher as set forth in claim 1 wherein there are a pair of air outlets in opposite sides of the protruberance disposed to receive air deflected by the protruberance rear surface.

4. A grass catcher as set forth in claim 1 wherein the baffle extends in part across the forward end of the protruberance.

5. A grass catcher as set forth in claim 1 wherein the housing is comprised of two separate pieces capable of nesting within each other when disassembled and being secured together to form the housing by means of fasteners.

6. A grass catcher as set forth in claim 5 wherein the two pieces of the housing comprises a lower half and an upper half, said lower and upper halves having overlapping peripheral portions, said peripheral portions having aligned apertures formed therein for receiving fasteners to secure said halves together.

* * * * *